Aug. 12, 1952     O. J. HUELSTER     2,606,353

ONE-WAY DETACHABLE SNAP FASTENER

Original Filed Oct. 25, 1944

INVENTOR
Otto J. Huelster.
BY H. F. Johnston
ATTORNEY

Patented Aug. 12, 1952

2,606,353

UNITED STATES PATENT OFFICE 2,606,353

ONE-WAY DETACHABLE SNAP FASTENER

Otto J. Huelster, Plymouth, Conn., assignor to Scovill Manufacturing Company, Waterbury, Conn., a corporation of Connecticut Continuation of application Serial No. 560,276, October 25, 1944. This application June 17, 1950, Serial No. 168,802

1 Claim. (Cl. 24—218)

This invention relates to one-way snap fasteners or those capable of being detached by the application of a pull at only one position.

The invention is an improvement upon the construction disclosed in my prior Patent No. 2,328,016, issued August 31, 1943, and is a continuation of my co-pending application Serial No. 560,276, filed October 25, 1944 and now abandoned.

One of the objects of the present invention is to minimize the required tilting action of the parts to separate the fastener elements in the one-way off position. By thus reducing the required tilting movement, I find it is possible to reduce substantially the amount of deformation of the head required for easy and certain action. This is of great importance as a practical matter because this lesser degree of deformation of the stud head lends itself much more easily to being done during the operation of attaching the stud fastener part to the garment. If the required deformation of the head is so much that it must be preformed, then the expense of hand registering during the assembly of the parts on a garment or other article becomes prohibitive.

It is another object of my invention to bring into play the binding action on the split ring upon the application of a separating force to the fastened socket and stud at any but the one proper place, much quicker and more positively than in prior constructions. In other words, this binding action is effective upon only a slight relative tilting movement, preferably 5 degrees or less.

Other novel aspects and advantages of the invention will be understood from the following description when read with reference to the accompanying drawing.

Figure 1:
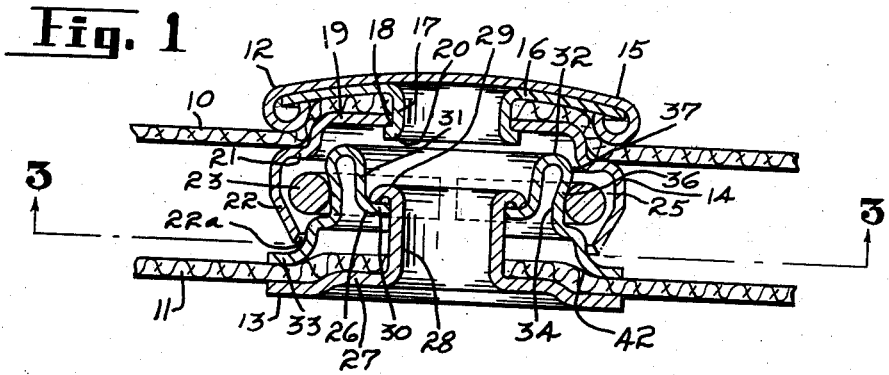
Fig. 1 is a central sectional view through the stud and socket members in normal assembled relationship on the angle indicated at line 1—1 in Fig. 3.
Figure 2:
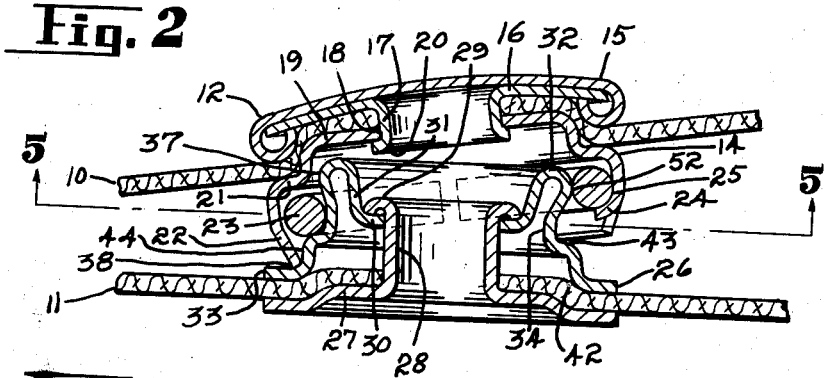
Fig. 2 is a central sectional view on line 2—2 of Fig. 3 showing the parts being uncoupled in the one-way off position.
Figure 3:
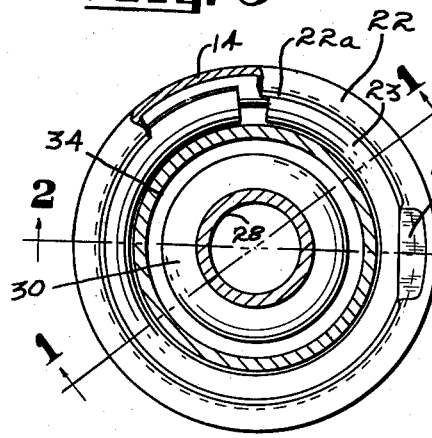
Fig. 3 is a cross sectional view on line 3—3 of Fig. 1.

In Figs. 1 and 2 of the drawing, I have shown at 10 and 11 portions of two supports to which socket members 12 and stud members 13 are secured.

The socket member 12 comprises a casing part 14 arranged upon one surface of the support 10 and a cap part 15 arranged on the other surface thereof, the parts 14 and 15 being secured together and to the support 10 by a coupling disc 16 having a tubular neck 17 passed through an aperture 18 in the bottom wall 19 of the casing 14 and flared or spun over, as seen at 20.

The bottom wall 19 has a supplemental ring-like bottom wall or shoulder 21. The wall of the casing 14 has an inwardly flared or tapered portion 22 which retains a spring ring 23 against displacement from the casing 14. The portion 22 of the casing has at one section an inwardly struck seat or lip 24 which supports the adjacent portion of the spring ring 23 in raised position within the socket 25 of the casing 14, thus controlling the position on the casing 14 or the socket member 12 where the stud member 13 can be detached therefrom and locating the point of one-way detachment of the socket and stud members.

The stud member 13 comprises a stud part proper 26 arranged on one surface of the support 11, and secured to said support by a mounting disc part 27 having a coupling sleeve portion 28, the end of which is flared or spun over, as seen at 29 onto an annular flange 30 of the part 26.

The flange 30 of the part 26 is arranged at the inner end of an annular wall portion 31 forming the inner wall of the head 32 of the stud member 13 or the part 26 thereof. The head 32 is in the form of an annular ring-like body semicircular in cross sectional form.

Particular attention should now be given to the construction of the stud part 26 between the head portion 32 and the ring-like base plate 33. The smallest diameter or neck portion is a cylindrical wall 34 which joins the head 32 by an outwardly flared or tapered wall portion 36. This tapered wall gradually merges into the cylindrical neck of the stud thus eliminating any trapping recess for the spring ring 23 and permits of an easier release of the ring over the larger diameter 37 of the head 32 when separating the stud and socket parts.

Now instead of the neck wall 34 extending straight onto the ring base 33 I interpose a shoulder 42 having a top or ring supporting surface 43 and a side surface 44 of substantially larger diameter than the neck wall 34 or even of the head 32. It will be observed that this shoulder 42 extends into the socket shell and the side wall 44 fits quite closely to the lower edge 22a of the inwardly tapering wall 22 for an important purpose which will later appear.

Figure 5:
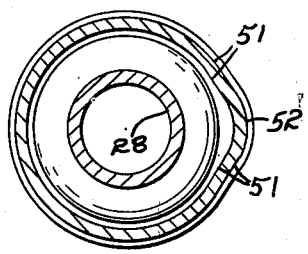
Fig. 5 is a cross section through the stud only at line 5—5 of Fig. 2.

The stud as manufactured and sold to the trade apparent from Figs. 2 and 5, in such a way as to provide reliefs 51 and between them a slight bulge 52 in the stud head 32. It will be understood, of course, that the bulge 52 is formed so as to align itself with the lip or seat 24 of the socket. The purpose of these reliefs and resulting bulge is to permit easier off action in unfastening the stud and socket members. These reliefs are of particular importance when the split in the ring 23 is perchance located either side of the support lip 24 of the socket and therefore when assembled to the stud the split of the ring will lie adjacent to the bulge at one side or the other. In that event if the reliefs are not present there is a tendency for one end of the ring to catch on one side of the head and bind.

The improved functioning of the parts first in the unsnapping operation (Fig. 2) and secondly in the binding effect (Fig. 4) when a pull is put on the fastener side at an improper place, will now be described. It will be observed in Fig. 2 that the edge 22a of the socket shell 14 has a fulcrum point 38 against the side 44 of the shoulder 42. This limits any side movement of the shell 14 and results in a definite control of the action on the spring ring 23. In other words, the distance between the fulcrum point 38 and the point of bearing between the ring and stud head, as appearing in Fig. 2 is a definite thing and thus determines within very close limits the degree of stretching of the spring, thus providing uniformity of action. Next, it will be observed that the spring 23 is bearing against the top surface 43 of the shoulder 42 at the point opposite the lip 24, thus definitely controlling the amount of tilting action of the spring. It is well understood that the greater the angularity of the spring in relation to the stud, the harder will be the unsnapping action. This control, along with the control of the fulcrum point 38, assures a dependable and uniform action. In this operation the lip 24 lifts the spring without any binding action since the spring can shift laterally along the lip.

Figure 4:
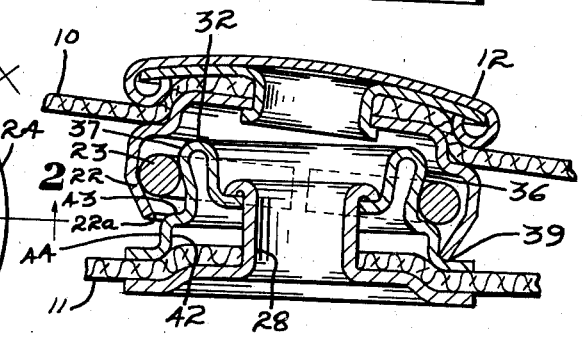
Fig. 4 is a central sectional view at a typical random angle showing the binding action coming into play to prevent separation by a pull at some other location than the one-way off position.

Now, if a separating force is applied to the fastened socket and stud at any but the position of Fig. 2, the parts will assume the position of Fig. 4 which again illustrates the marked advantages of the large diameter portion of the shoulder 42. In Fig. 4 the socket is shown tilted relative to the stud at an angle of approximately 5 degrees to facilitate illustration of the principle, but in actual practice, this angle is preferably limited to less than 5 degrees. In this position it will be observed that the tapering wall on skirt 22 of the socket goes against the ring and binds it tightly between the socket tapered wall 22 and the tapered wall 36 of the head. Since the spring is thus confined it can no longer expand to allow the stud to be pulled out.

It is to be noted from Fig. 4 that on the opposite side from the pull on the socket 14 in any circumferential position the tapered wall 22 of the socket has its edge 22a bearing at 39 against the side 44 of the shoulder 42. This is a definite limiting factor or control of the allowable angular displacement of the socket and stud, because it limits sidewise shifting of the socket thus bringing the binding action of the spring into play much quicker and more positively. Thus the socket and stud cannot be separated unintentionally even by the application of a relatively heavy force, or even when such force is applied quite close to but not actually at the proper place for detachment.

As a result of my invention, and especially by reason of the shoulder 42 with its functioning top and side surfaces 43 and 44, I have produced a snap fastener which very reliably can be depended upon to unsnap when the separating force is applied only at the right position. Furthermore, by reason of the definite controls provided by this shoulder my improved fastener has a reliable and uniformly easy action and one which is obtainable without greater deformation of the socket or stud than can be readily produced by the tools employed to assemble fastener parts to a garment or the like.

What I claim is:

A one-way detachable snap fastener, the socket member of which includes a ring retaining shell having a side wall tapering radially inwardly, a spring ring within the shell and confined by said tapering wall, a lip struck inwardly from the bottom edge of said socket tapering wall to serve as a seat for the spring ring and limiting the downward movement of the spring ring, and a stud for detachable engagement with said socket having a cylindrical neck portion around which the spring fits when the fastener is assembled, an enlarged head beyond the cylindrical neck portion sufficiently larger than the internal diameter of the spring ring for snapping engagement therewith, the cross sectional diameter of the spring ring being greater than the space between the stud head and the smaller diameter portion of the socket tapering wall when the shell is lifted in relation to the stud head so as to provide a wedging action between the members, a tapering wall smoothly joining the cylindrical neck to the head, a ring base, and a shoulder between said ring base and the cylindrical neck, which shoulder extends entirely around the stud, said shoulder presenting a top surface and a side surface whose diameter is substantially larger than the diameter of said head, said shoulder extending into the shell opening and having only slight clearance between its side wall and the edge of the socket tapering wall such that on relative tilting of the stud and socket the edge of the socket tapering wall will engage against said shoulder side wall, whereby upon the application of a separating force at the location of said lip the top surface of said shoulder will serve as a control of the angular tilting of the spring ring to permit the ring to be expanded and lifted by the lip over the stud head to release the members, and when a tilting force is applied to the socket at a location other than the lip the side wall will serve as a control to limit the lateral shifting of the socket in relation to the stud and thus limit and control the relative angular displacement required to bind or wedge the spring wire ring between the stud head and the tapering wall of the socket to prevent the ring from being expanded over the stud head.

OTTO J. HUELSTER.

REFERENCES CITED

The following references are of record in the file of this patent:

UNITED STATES PATENTS

| Number | Name | Date |
| --- | --- | --- |
| 2,328,016 | Huelster | Aug. 31, 1943 |